(12) United States Patent
Erbe et al.

(10) Patent No.: US 11,076,630 B2
(45) Date of Patent: Aug. 3, 2021

(54) SYSTEM FOR PRODUCING A FOOD ITEM, COMPRISING AN EXTRUSION HEAD STORAGE CHAMBER

(71) Applicant: BSH HAUSGERAETE GMBH, Munich (DE)

(72) Inventors: Sebastian Erbe, Bretten (DE); Ugur Dogan Guel, Munich (DE); Lucia Schuster, Stuttgart (DE); Alvaro Suarez Iribarne, Barcelona (ES)

(73) Assignee: BSH Hausgeraete GmbH, Munich (DE)

( * ) Notice: Subject to any disclaimer, the term of this patent is extended or adjusted under 35 U.S.C. 154(b) by 405 days.

(21) Appl. No.: 16/312,486

(22) PCT Filed: Jun. 8, 2017

(86) PCT No.: PCT/EP2017/063977
§ 371 (c)(1),
(2) Date: Dec. 21, 2018

(87) PCT Pub. No.: WO2017/220335
PCT Pub. Date: Dec. 28, 2017

(65) Prior Publication Data
US 2019/0142057 A1  May 16, 2019

(30) Foreign Application Priority Data

Jun. 22, 2016  (DE) .......................... 102016211161.2

(51) Int. Cl.
*A23P 30/00*  (2016.01)
*A23L 5/10*  (2016.01)
(Continued)

(52) U.S. Cl.
CPC .................. *A23P 30/20* (2016.08); *A23L 5/10* (2016.08); *A47J 36/32* (2013.01); *A47J 37/01* (2013.01);
(Continued)

(58) Field of Classification Search
CPC ....... B29C 64/25; B29C 35/002; B29C 71/02; B29C 64/188; B22F 10/40; B22F 10/47;
(Continued)

(56) References Cited

U.S. PATENT DOCUMENTS 6,280,784 B1 *  8/2001  Yang ..................... B29C 64/106
426/231
2013/0034633 A1 *  2/2013  von Hasseln .......... B33Y 10/00
426/104
(Continued)

FOREIGN PATENT DOCUMENTS

CN  104921281 A  9/2015
CN  105196553 A  12/2015
(Continued)

*Primary Examiner* — Ibrahime A Abraham
*Assistant Examiner* — John J Norton
(74) *Attorney, Agent, or Firm* — Laurence A. Greenberg; Werner H. Stemer; Ralph E. Locher

(57) ABSTRACT

A system for producing a cooked food item. The system includes an extrusion chamber having a moving extrusion head for extruding an extrusion compound, and a cooking chamber arranged above the extrusion chamber and having a cooking device for cooking the extrusion compound. The system also includes a moving support surface for the extrusion compound, which can be moved between the extrusion chamber and the cooking chamber by way of a movement mechanism. The system additionally includes a storage chamber for receiving the extrusion head. The storage chamber is arranged laterally next to the extrusion chamber.

15 Claims, 3 Drawing Sheets

(51) Int. Cl.
*B33Y 30/00* (2015.01)
*B33Y 50/02* (2015.01)
*B33Y 70/00* (2020.01)
*A47J 36/32* (2006.01)
*A47J 37/01* (2006.01)
*A23P 30/20* (2016.01)
*A23P 20/25* (2016.01)

(52) U.S. Cl.
CPC .............. *B33Y 30/00* (2014.12); *B33Y 50/02* (2014.12); *B33Y 70/00* (2014.12); *A23P 2020/253* (2016.08); *A23V 2002/00* (2013.01)

(58) Field of Classification Search
CPC ........ B22F 12/222; B22F 12/38; B22F 10/64; B22F 12/10; B23K 26/342; B23K 26/70; B23K 26/702
See application file for complete search history.

(56) References Cited

U.S. PATENT DOCUMENTS

| 2016/0067866 | A1* | 3/2016 | Sekar ................... B25J 9/0084 99/348 |
| 2016/0106142 | A1 | 4/2016 | Contractor et al. |
| 2016/0135493 | A1 | 5/2016 | Kuo et al. |
| 2017/0282457 | A1* | 10/2017 | Burns .................. B33Y 30/00 |
| 2018/0001553 | A1* | 1/2018 | Buller .................. B29C 64/393 |
| 2018/0007949 | A1* | 1/2018 | Sung ..................... B33Y 70/00 |
| 2018/0222115 | A1* | 8/2018 | Watanabe ............ G03G 15/224 |

FOREIGN PATENT DOCUMENTS

| DE | 102014011882 A1 | 2/2016 | |
| DE | 102016221821 A1 * | 5/2018 | ............. B29C 64/30 |
| WO | 2014190168 A1 | 11/2014 | |
| WO | 2014190217 A1 | 11/2014 | |
| WO | 2015106059 A1 | 7/2015 | |

* cited by examiner

SYSTEM FOR PRODUCING A FOOD ITEM, COMPRISING AN EXTRUSION HEAD STORAGE CHAMBER

BACKGROUND OF THE INVENTION

Field of the Invention

The invention relates to a system, in particular a household appliance or home appliance, for printing and cooking an item of food.

Food printers can be used to produce a spatial arrangement of printing mass from an edible printing mass. The spatial arrangement of printing mass can then be cooked in a separate cooking unit, in particular in a separate oven, in order to provide an individualized, cooked food item.

The present document concerns the technical object of providing a system with which it is possible to simplify and speed up the production of an individualized cooked food item.

SUMMARY OF THE INVENTION

The object is achieved by the subject matter of the independent claim. Optional advantageous embodiments are defined, in particular, in the dependent claims, described in the description below or represented in the figures of the accompanying drawing.

According to one aspect of the invention, a system for producing a cooked food item is described. The system can be embodied as a household appliance or a home appliance, which can be placed on a work surface in a kitchen, for instance, and/or integrated into a built-in unit. In particular, the system can have dimensions (e.g. edges of 50 cm long or less), which enable it to be used as a household appliance.

The system comprises a printing chamber with a mobile printhead (extrusion head) for the extrusion of printing mass, and a cooking chamber with means for cooking the printing mass. The chambers can be arranged within a housing of the system. In particular, the chambers can be formed at least partially by walls of a housing of the system. The printing chamber can be used to print an item of food, and the cooking chamber can be used for cooking an item of food. In this case the cooking chamber can preferably be arranged above the printing chamber. This is in particular advantageous in order to keep the thermal energy of the cooking chamber inside the cooking chamber.

The system further comprises a moving tray which can be moved between the printing chamber (i.e. a first location or position) and the cooking chamber (i.e. a second location or position) by a movement mechanism. The tray can form a wall of the cooking chamber and/or of the printing chamber, in particular if the tray is located in or on the cooking chamber (i.e. in the second location). The system can comprise one or more (vertical) guide rails running between the printing chamber and the cooking chamber for the movement of the tray, it being possible to move the moving tray along said guide rails between the printing chamber and the cooking chamber by means of the movement mechanism. Thus an efficient and precise movement of the tray can be enabled.

Additionally the system comprises a storage chamber for receiving the printhead, said storage chamber being arranged laterally next to the printing chamber. The storage chamber can be arranged such that the printhead can be removed from the movement trajectory of the tray between the first location and the second location by being transferred into the storage chamber. Furthermore, the storage chamber can be arranged such that the storage chamber forms a protection for the printhead during a cooking operation inside the cooking chamber. The storage chamber thus enables a printing chamber and a cooking chamber to be provided inside a single appliance. Thus individually printed and cooked items of food can be produced in a convenient and reliable manner. In particular an automatic transition between the printing chamber (for printing an item of food) and the cooking chamber (for cooking the food item) is enabled.

The system can further comprise a control unit which is designed to trigger the mobile tray to be arranged in the printing chamber and/or below the printhead (i.e. in the first location) in order for a spatial arrangement of printing mass to be generated. Moreover, the control unit is configured to activate the printhead in order to produce a spatial arrangement of printing mass on the tray. In particular, printing mass can (e.g. according to a recipe) be extruded from one or more nozzles of the printhead and set down onto the tray so that a spatial arrangement of printing mass is produced.

The control unit is further designed to actuate the printhead to pass into the storage chamber following the printing operation. Thus the path for a transfer of the tray from the first location (for the printing operation) to the second location (for the cooking operation) can be freed up. Furthermore, in this way the printhead can be protected against damage during the cooking operation.

Additionally the control unit is designed to actuate the movement mechanism to transfer the moving tray containing the spatial arrangement of printing mass into the cooking chamber (i.e. to the second location). In other words, the tray can be transferred from the first location or position (for the creation of a spatial arrangement of printing mass) to the second location or position (for cooking the spatial arrangement of printing mass).

Additionally the control unit is designed to actuate the means for cooking, in order that by cooking the spatial arrangement of printing mass a cooked food item is produced. Thus an item of food can automatically be printed and cooked within the system.

The system may comprise a thermally insulating wall which is designed to insulate the storage chamber thermally from the cooking chamber, in particular if the tray is located in the cooking chamber. Thus the printhead can be protected against damage during a cooking operation inside the storage chamber. The thermally insulating wall can in this case be formed at least partially by the tray. In particular the tray can be designed such that the tray closes the cooking chamber off from the printing chamber. Furthermore, the tray can comprise a thermally insulating layer.

Alternatively or additionally, the storage chamber can comprise a moving gate (e.g. a displaceable gate), with which the storage chamber can be closed off from the printing chamber. For example, the moving gate can be pushed between the storage chamber and the printing chamber if the printhead is located inside the storage chamber. Thanks to the moving gate the opening between the printing chamber and the storage chamber can then be closed. The moving gate can have a thermally insulating layer. Thus the thermally insulating wall can comprise a moving gate of the storage chamber.

The storage chamber can comprise temperature adjustment means in order to adjust the temperature in the interior of the storage chamber (in particular to cool it). Thus the printhead can be protected particularly well against the effects of heat from the cooking chamber. The temperature adjustment means can comprise a blower in order to bring about a circulation of air in the interior of the storage chamber. Furthermore, the temperature adjustment means can comprise a heat exchanger in order to transfer thermal energy from the interior to an area surrounding the storage chamber. Additionally the temperature adjustment means can comprise a ventilation channel, via which air can be removed from the interior of the storage chamber and via which air can be guided into the interior of the storage chamber. Thus thanks to the temperature adjustment means thermal energy can be removed from the interior of the storage chamber efficiently and reliably, in order to cool the printhead.

The system can comprise one or more lateral guide rails which extend from the printing chamber into the storage chamber. The printhead can be designed to move along the one or more lateral guide rails between the printing chamber and the storage chamber. In particular the control unit can be designed to enable the printhead to move along the one or more lateral guide rails to create the spatial arrangement of printing mass. Furthermore, the control unit can be designed to enable the printhead to move along the one or more lateral guide rails into the storage chamber following the printing operation. The printhead can comprise one or more actuators (in particular electric motors) for this purpose, in order to move along the one or more lateral (or horizontal) guide rails. Thanks to the provision of one or more guide rails which extend into the storage chamber an efficient movement of the printhead can be enabled.

The control unit can be configured to transfer the mobile tray, once a cooking process within the cooking chamber is complete, from the cooking chamber (i.e. from the second location) into the printing chamber (i.e. into the first location), in order to make the cooked food item accessible to a user of the system. It is therefore possible to dispense with a dedicated access (e.g. via a flap) to the cooking chamber, as a result of which the thermal insulation of the cooking chamber is improved. Furthermore, it is possible for a user to remove the cooked food item from the relatively cool printing chamber and not from a potentially hot cooking chamber in a convenient and non-critical manner.

The means for cooking can comprise ferromagnetic material in or on the tray. Furthermore, the means for cooking can comprise an induction coil, which is designed such that it can heat the ferromagnetic material by generating a magnetic field when the tray is disposed within the cooking chamber (i.e. in the second location) for a cooking process. The use of induced heat in or on the tray allows an item of food to be cooked in a particularly efficient manner. In particular, a broiled food item can be produced in this way.

Alternatively or in addition, the means for cooking can comprise one or more heating elements, which are configured to heat the cooking chamber and/or printing mass by means of convection (e.g. by heating the atmosphere within the cooking chamber) and/or by means of irradiation (e.g. by microwaves). A baked and/or otherwise heated food item can therefore be provided.

The printhead can comprise one or more printing mass containers with in each case at least one nozzle, by means of which printing mass can be extruded from the respective printing mass container onto the tray. Complex food items (e.g. with layers of different printing masses) can be produced as a result of the provision of a number of printing mass containers.

The printhead can comprise at least one temperature adjustment unit (e.g. heating and/or cooling) for at least one printing mass container and/or for at least one nozzle, with which the temperature of the printing mass in the printing mass container and/or in the nozzle can be adjusted, in order to change flow properties of the printing mass. By adjusting the temperature of the printing mass, precise production of food items can be guaranteed.

The printhead can be moved along one or more lateral guide rails at least within one plane (e.g. in an X/Y plane parallel to the tray, at a particular distance Z from the tray) via the moving tray. The control unit can be designed to actuate the printhead and/or the movement mechanism in order to create the spatial arrangement of printing mass on the moving tray. The control unit can in particular be designed to actuate the movement mechanism of the tray, to change a distance between the tray and the printhead, in order to apply layers of printing mass to the spatial arrangement of printing mass. By adjusting the distance during the printing process different layers can be applied to the arrangement of printing mass in a precise manner. In this case a movement of the tray is advantageous, since in this way a low-cost and space-saving printhead can be used, which cannot be moved in the Z direction. In other words, the adjustment of the distance between printhead and tray can be brought about (where appropriate exclusively) by movement of the tray.

It should be noted that any aspects of the system described in this document can be combined with one another in multiple ways. In particular the features of the claims can be combined with one another in multiple ways.

BRIEF DESCRIPTION OF THE SEVERAL VIEWS OF THE DRAWING

The invention is described in greater detail below using exemplary embodiments illustrated in the figures of the attached drawing, in which.

DESCRIPTION OF THE INVENTION

Figure 1:
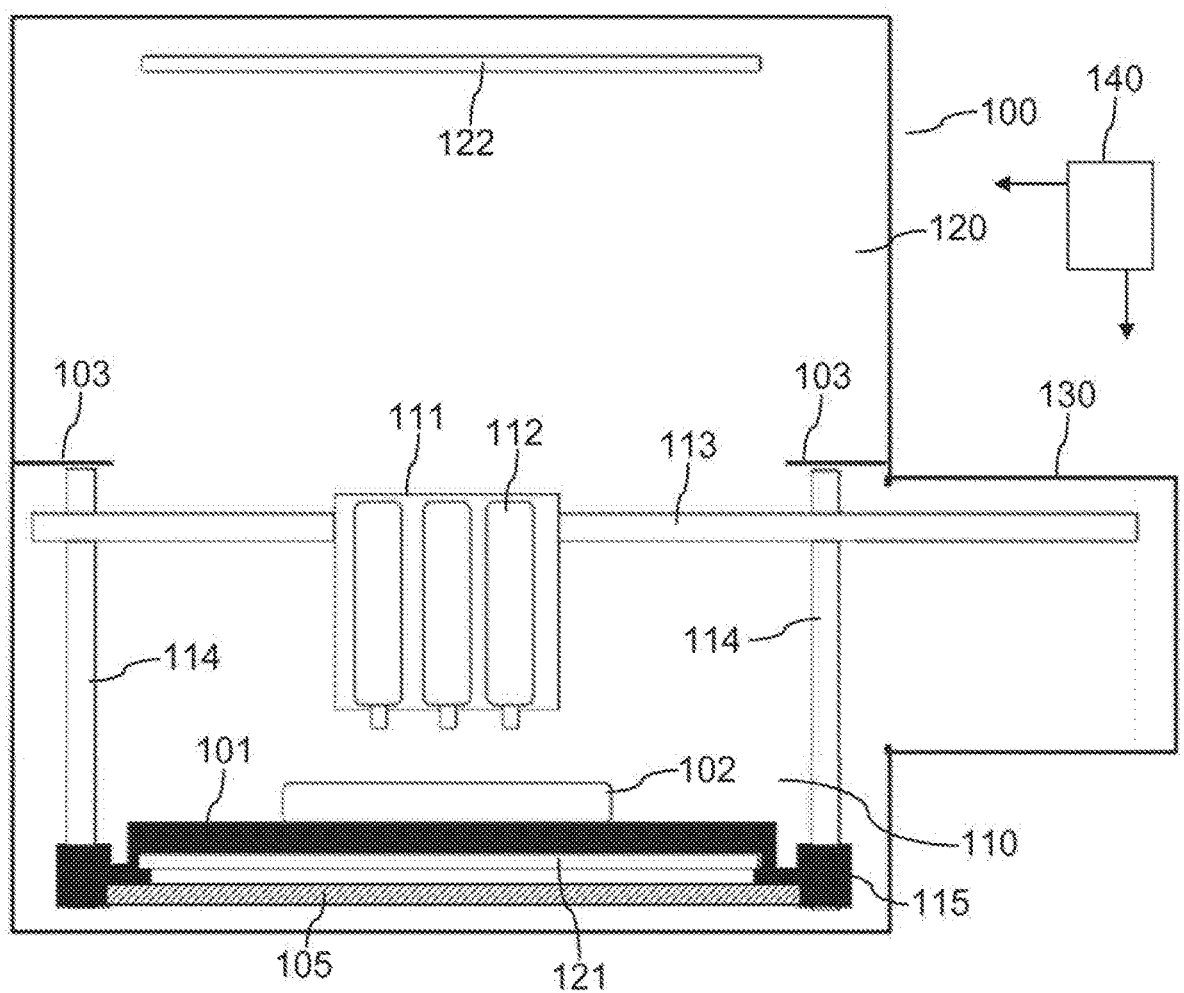
FIG. 1 shows a block diagram of a system for producing an item of food in a printed state, i.e. in a first location.

As set out in the introduction, the present document relates to the convenient production of individualized, cooked food items. In this connection FIG. 1 shows a system 100 for producing an item of food having a moving tray 101, with which a spatial arrangement of printing mass for an item of food 102 can be transferred from a printing chamber 110 to a cooking chamber 120 in order to cook the food item 102. Furthermore, on conclusion of the cooking operation a finished food item 102 can be transferred from the cooking chamber 120 back to the printing chamber 110 by means of the moving tray 101, e.g. in order to enable the convenient removal of the cooked food item 102 or to continue the printing operation. Thanks to the automatic traversal between a printing chamber 110 and a cooking chamber 120 an item of food 102 can be printed, cooked and provided within a single system or within a single appliance 100 in a convenient and individual manner.

In the example illustrated in FIG. 1 the printing chamber 110 (for printing a spatial arrangement of printing mass) is arranged underneath or below the cooking chamber 120. The moving tray 101 can be moved along one or more (vertical) guide rails 114 from the printing chamber 110 below to the cooking chamber 120 above. For this purpose the moving tray 101 can be guided with a movement mechanism 115 (e.g. with a gear wheel driven by a motor) along the one or more guide rails 114.

The printing chamber 110 comprises a printhead 111 with one or more nozzles 112, wherein a type of printing mass can in each case be extruded onto the tray 101 through each nozzle 112, in order to create a spatial arrangement of printing mass. A nozzle 112 can have means (not shown) with which the flow properties of the respective printing mass can be influenced. For example, the means can comprise a temperature adjustment unit, in particular a heating and/or cooling unit, to adjust the temperature of the printing mass to be extruded.

The printhead 111 can be moved to different positions above the tray 101 along one or more (lateral or horizontal) guide rails 113, in order to be able to extrude printing mass at different positions. In particular the printhead 111 can be moved in the X and Y direction inside a plane (at the same distance from the tray 101). Furthermore, the printhead 111 can if appropriate be moved in the Z direction, in order to change the distance between printhead 111 and tray 101. Alternatively or additionally the distance in the Z direction can be effected by raising and/or lowering the tray 101.

The nozzles 112 and the movement of the printhead 111 or the movement of the tray 101 along the guide rails 113, 114 can be actuated via a control unit 140 of the system 100, in order to move the printhead 111, to move the tray 101 and/or to extrude printing mass. In this case the actuation can take place as a function of a recipe, wherein the recipe specifies the shape of the spatial arrangement of printing mass to be created and the positions, quantities and types of the one or more printing masses to be extruded for this purpose. Thus a spatial arrangement of printing mass can be reliably generated inside the printing chamber 110.

Figure 2:
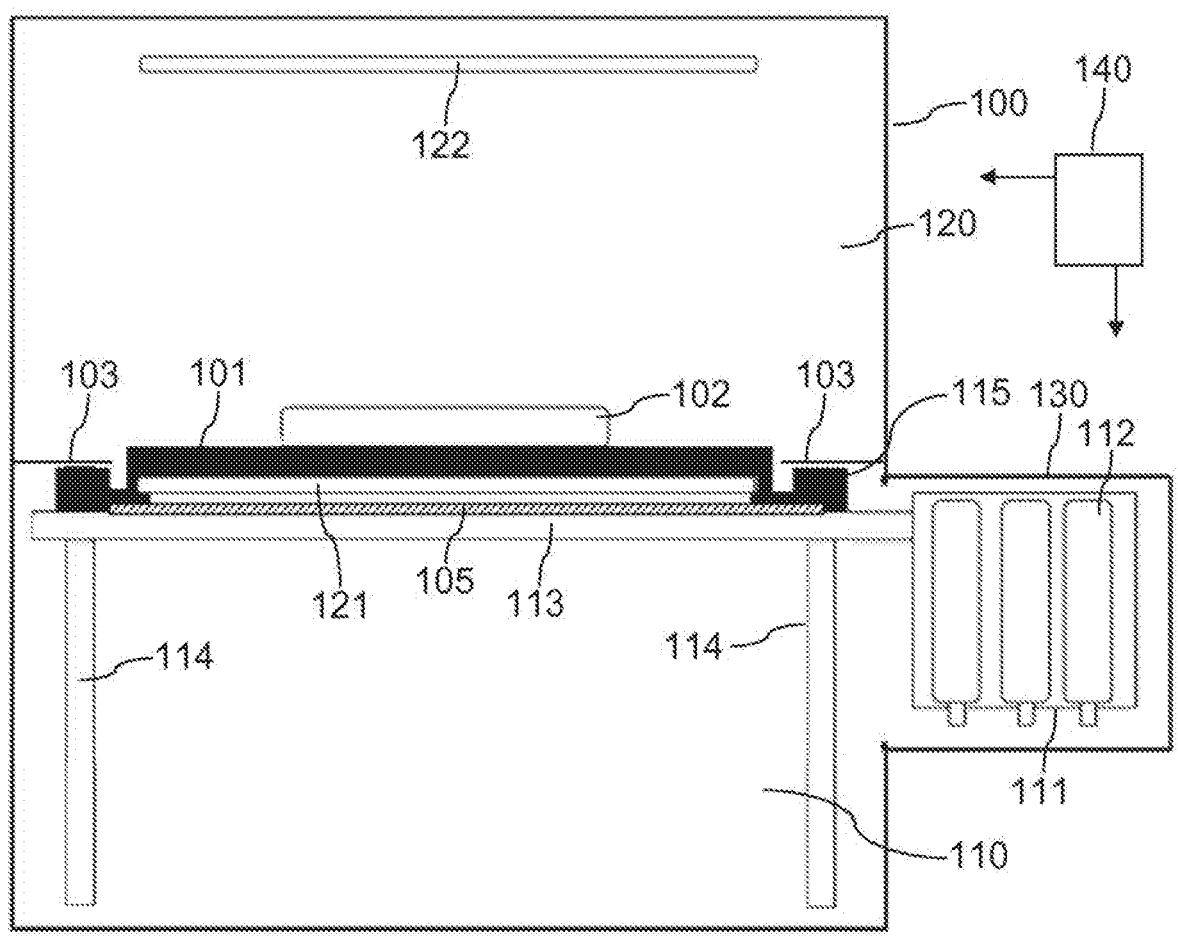
FIG. 2 shows a block diagram of a system for producing an item of food in a cooked state, i.e. in a second location.

On completion of the spatial arrangement of printing mass the movement mechanism 115 can be actuated by the control unit 140, in order to move (e.g. raise) the tray 101 from the printing chamber 110 (i.e. from a first location illustrated in FIG. 1) to the cooking chamber 120 (i.e. to a second location illustrated in FIG. 2). FIG. 2 shows the status of the system 100 if the tray 101 is located in the cooking chamber 120 (i.e. in the second location) for a cooking operation. The cooking chamber 120 can be closed off from the printing chamber 110 for the cooking operation by the tray 101 itself and by wall segments 103. Thus a reliable thermal insulation between cooking chamber 120 and printing chamber 110 can be provided. Furthermore, soiling or damage to the printing chamber 110 or the printhead 111 as a result of the cooking operation can be prevented in this way.

The cooking chamber 120 has one or more means 121, 122 for cooking the spatial arrangement of printing mass. The means 121, 122 for cooking can for example comprise an induction coil, with which ferromagnetic material 121 can be heated in or on the tray 101, in order to warm or heat the spatial arrangement of printing mass from below and thus to cook it. Furthermore, the means 121, 122 for cooking can comprise one or more heating elements 122 (e.g. above and/or to the side of the spatial arrangement of printing mass), e.g. in order to heat the cooking chamber 120 and thereby to process the spatial arrangement of printing mass into a cooked food item 105. The means 121, 122 for cooking can be actuated by the control unit 140 (in particular as a function of a recipe which describes parameters of the cooking operation).

Thus a system 100 (and in particular a household appliance) can be provided which can autonomously print and cook an item of food 102. In particular the food item 102 can be conveyed effectively and autonomously by a moving tray 101 from a printing chamber 110 of the system 100 to a cooking chamber 120 of the system 100 (and vice versa). Thus the convenience and time expenditure for the production of an item of food 102 can be reduced. Furthermore, thanks to the integration of printing chamber 110 and cooking chamber 120 in a single system 100 (with a single housing) the space required can be reduced. This applies in particular if printing chamber 110 and cooking chamber 120 are arranged one above the other.

The system 100 further comprises a printhead storage chamber 130, into which the printhead 111 can be transferred via the one or more (lateral) guide rails 113, in order to remove the printhead 111 from the movement trajectory of the tray 101 (between the first location and the second location) and in order to protect the printhead 111 during a cooking operation. The printhead storage chamber 130 can, as illustrated in FIGS. 1 and 2, be arranged laterally next to the printing chamber 110. The one or more lateral guide rails 113 can extend laterally beyond the printing chamber 110 into the printhead storage chamber 130, such that the printhead 111 can be transferred along the one or more lateral guide rails 113 into the storage chamber 130 following a printing operation.

Figure 3:
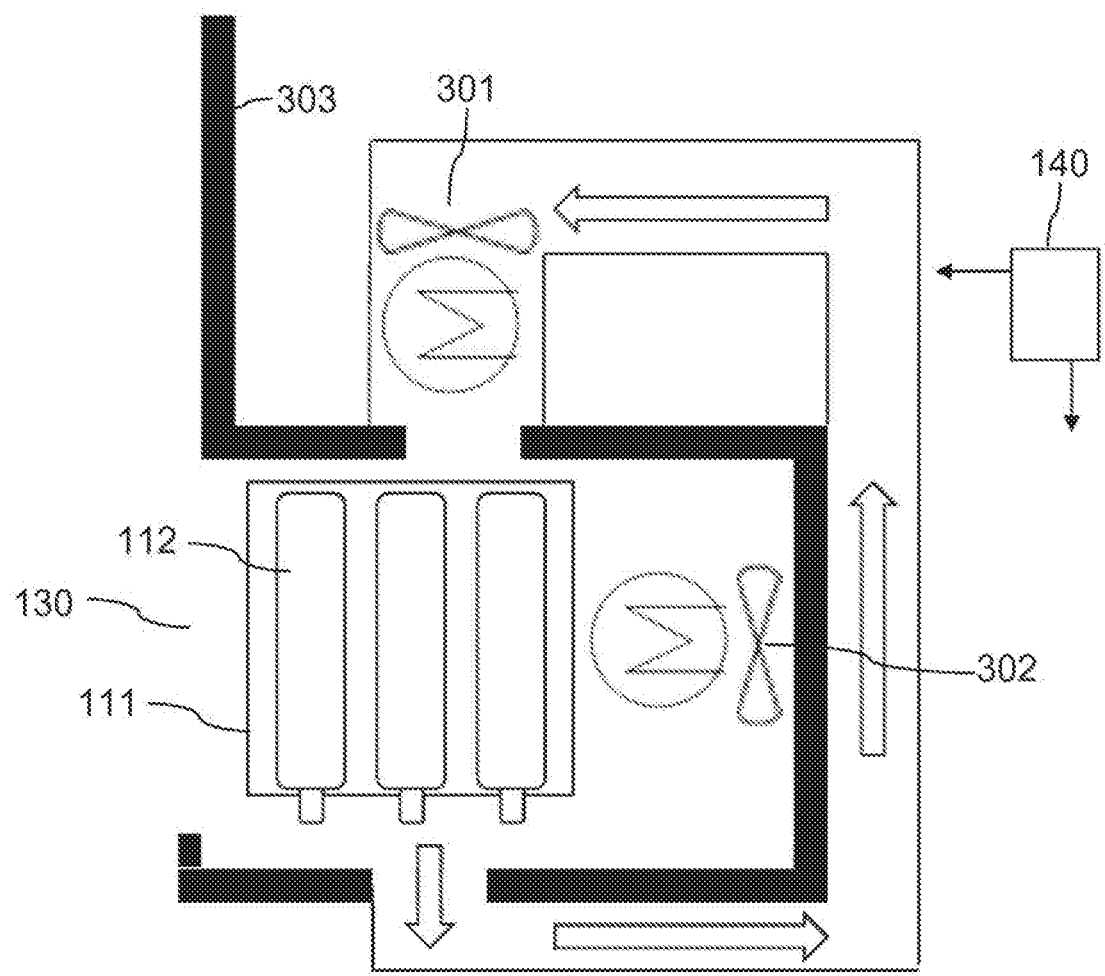
FIG. 3 shows by way of example temperature adjustment means for a printhead storage chamber.

FIG. 3 shows further details of the storage chamber 130. The storage chamber 130 can comprise temperature adjustment means 301, 302, which are designed to adjust the temperature of the storage chamber 120, in particular to cool it, in order to protect the printhead 111 from the effects of heat from the cooking chamber 120. The temperature adjustment means 301, 302 can for example comprise a blower in order to bring about a circulation of air. Furthermore, the temperature adjustment means 301, 302 can comprise a heat exchanger, in order to remove thermal energy from the storage chamber 130. The temperature adjustment means 301 thereby bring about a circulation of air via a ventilation channel which lies outside the storage chamber 130 (see arrow illustrated in FIG. 3), while the temperature adjustment means 302 bring about a circulation of air that takes place exclusively inside the storage chamber 130. A heat exchanger can for example comprise cooling fins, in order to dissipate thermal energy from the interior of the storage chamber 130 to the area surrounding the storage chamber 130.

The storage chamber 130 can be thermally insulated from the cooking chamber 120. In particular, during a cooking operation a thermally insulating wall can be moved between the cooking chamber 120 and the storage chamber 130, in order to insulate the storage chamber 130 thermally from the cooking chamber 120 and in order thus to protect the printhead 111 against damaging effects of heat.

The thermally insulating wall can be formed at least partially by the tray 101. For a cooking operation the tray 101 is moved upward as illustrated in FIG. 2. The tray 101 can in this case be designed such that the cooking chamber 120 is closed off downward from the printing chamber 110 and the storage chamber 130 by the tray 101 (e.g. in interaction with wall segments 103). Furthermore, the tray 101 and if appropriate the wall segments 103 can have a thermally insulating layer 105, in order to insulate the cooking chamber 120 thermally from the printing chamber 110 and the storage chamber 130.

Alternatively or additionally the thermally insulating wall between the cooking chamber 120 and the storage chamber 130 can be provided by a gate 303, with which the storage chamber 130 can be closed off from the printing chamber 110 on receipt of the printhead 111. For example, as illustrated in FIG. 3, a sliding gate 303 can be pushed between the storage chamber 130 and the printing chamber 110. The gate 303 of the storage chamber 130 can in this case have a thermally insulating layer and thus insulate the storage chamber 130 thermally from the printing chamber 110 and the cooking chamber 120.

The system 100 described in this document enables an item of food 102 to be printed and cooked inside a single appliance in an automatic and space-saving manner. In this case the (hot) cooking chamber 120 is advantageously arranged above the printing chamber 110, so that the heat can be retained efficiently inside the cooking chamber 120. The system 100 additionally comprises a storage chamber 130 for the printhead 111, so that the printhead 111 can be reliably protected from damage during a cooking operation.

The present invention is not restricted to the exemplary embodiments shown. In particular it should be noted that the description and the figures are merely intended to exemplify the principle of the proposed system.

The invention claimed is:

1. A system for producing a cooked food item, the system comprising:
   a movably supported printhead for extruding a printing mass disposed in a printing chamber;
   a cooking device for cooking a printing mass disposed in a cooking chamber arranged above said printing chamber;
   a moving tray for a printing mass and a movement mechanism for moving said moving tray between said printing chamber and said cooking chamber; and
   a storage chamber arranged laterally next to said printing chamber for receiving said printhead;
   wherein said printhead, upon being received in said storage chamber, is removed from a movement trajectory of said moving tray from said printing chamber to said cooking chamber.

2. The system according to claim 1, further comprising a control unit configured to:
   enable said moving tray for creating a spatial arrangement of printing mass in said printing chamber to be arranged underneath said printhead;
   actuate said printhead to create the spatial arrangement of printing mass on said moving tray, and subsequently to move into said storage chamber;
   actuate said movement mechanism to transfer said moving tray containing the spatial arrangement of printing mass into said cooking chamber; and
   actuate the cooking device in order to cook the spatial arrangement of printing mass to produce a cooked food item.

3. The system according to claim 2, further comprising one or more lateral guide rails extending from said printing chamber into said storage chamber, and wherein:
   said printhead is configured to move along said one or more lateral guide rails between said printing chamber and said storage chamber;
   said control unit is configured to cause said printhead to move along said one or more lateral guide rails to create the spatial arrangement of printing mass; and
   said control unit is configured to cause said printhead to subsequently move along said one or more lateral guide rails into said storage chamber.

4. The system according to claim 3, wherein said control unit is configured to actuate said movement mechanism of said tray to change a distance between said tray and said printhead, in order to apply layers of printing mass to the spatial arrangement of printing mass.

5. The system according to claim 1, further comprising a thermally insulating wall disposed to thermally insulate said storage chamber from said cooking chamber.

6. The system according to claim 5, wherein:
   said thermally insulating wall is formed at least partially by said tray;
   said tray is configured to close off said cooking chamber from said printing chamber; and
   said tray includes an insulating layer.

7. The system according to claim 5, wherein:
   said storage chamber comprises a moving gate configured to close off said storage chamber from said printing chamber; and
   said thermally insulating wall comprises said moving gate.

8. The system according to claim 1, wherein said storage chamber comprises temperature adjustment devices in order to adjust a temperature of an interior of said storage chamber.

9. The system according to claim 8, wherein said temperature adjustment devices comprise:
   a blower in order to bring about a circulation of air in the interior of said storage chamber; and/or
   a heat exchanger in order to transfer thermal energy from the interior to an area exterior of said storage chamber.

10. The system according to claim 8, wherein said temperature adjustment devices include a ventilation channel, via which air can be removed from the interior of said storage chamber and via which air can be guided into the interior of said storage chamber.

11. The system according to claim 1, further comprising one or more vertical guide rails running between said printing chamber and said cooking chamber, and enabling said moving tray to be moved between said printing chamber and said cooking chamber by said movement mechanism.

12. The system according to claim 1, further comprising one or more lateral guide rails extending from said printing chamber into said storage chamber and enabling said printhead to move along said one or more lateral guide rails between said printing chamber and said storage chamber.

13. The system according to claim 1, wherein said cooking devices, comprise one or more heating elements configured to heat one or both of said cooking chamber and the printing mass by convection and/or by radiation.

14. The system according to claim 1, wherein said printhead comprises one or more printing mass containers, each having at least one nozzle, through which a printing mass is extruded onto said tray.

15. The system according to claim 1, wherein the system is configured as a household appliance to be placed on a work surface in a kitchen and/or integrated into a built-in unit of a kitchen.

* * * * *